United States Patent [19]
Wade

[11] Patent Number: 5,469,440
[45] Date of Patent: Nov. 21, 1995

[54] COMMUNICATIONS NETWORK AND METHOD

[75] Inventor: Christopher A. Wade, Suffolk, England

[73] Assignee: British Telecommunications, London, England

[21] Appl. No.: 142,384

[22] PCT Filed: Jun. 8, 1992

[86] PCT No.: PCT/GB92/01023

§ 371 Date: Nov. 23, 1993

§ 102(e) Date: Nov. 23, 1993

[87] PCT Pub. No.: WO92/22151

PCT Pub. Date: Dec. 10, 1992

[30] Foreign Application Priority Data

Jun. 6, 1991 [GB] United Kingdom ............... 9112180

[51] Int. Cl.[6] ......................................... H04J 3/16
[52] U.S. Cl. .............. 370/110.1; 370/95.3; 370/105.1
[58] Field of Search ..................... 370/110.1, 85.1, 370/105.1, 85.8, 85.2, 94.2, 94.3, 95.3, 17, 95.1, 85.7; 340/825.02, 825.08; 455/12; 375/354, 365; 371/33, 47.1, 62; 379/94, 95, 96

[56] References Cited

U.S. PATENT DOCUMENTS

| | | | |
|---|---|---|---|
| 4,847,833 | 7/1989 | Doering et al. | 370/110.1 |
| 5,081,704 | 1/1992 | Umeda et al. | 370/95.3 |
| 5,341,365 | 8/1994 | Clarke | 370/45.3 |

FOREIGN PATENT DOCUMENTS

| | | |
|---|---|---|
| 0245972 | 11/1987 | European Pat. Off. . |
| 0428407A2 | 5/1991 | European Pat. Off. . |

OTHER PUBLICATIONS

Hoppitt et al, "The Provision of Telephony Over Passive Optical Network", British Telecom Technology Journal, vol. 7, No. 2, pp. 101–114.

*Primary Examiner*—Douglas W. Olms
*Assistant Examiner*—Dang Ton
*Attorney, Agent, or Firm*—Nixon & Vanderhye

[57] ABSTRACT

A TPON network in which the multiframe format includes a control portion, and a traffic portion. In the control portion the control word for each outstation is in the form of a respective group of contiguous bits. In the traffic portion, which is constituted by a series of traffic frames, the traffic information in each traffic frame for each outstation is in the form of a respective group of contiguous bits. Such a multiframe format enables the use of single-transducer transceiver in the outstations, and compared with known TPON multiframe formats increases the maximum operating range for the network beyond which transmit/receive conflict will occur.

26 Claims, 1 Drawing Sheet

COMMUNICATIONS NETWORK AND METHOD

BACKGROUND OF THE INVENTION

1. Field of the Invention

This invention relates to communications networks and particularly but not exclusively to networks known in the art at TPON networks. TPON is an acronym for Telephony over Passive Optical Network.

2. Related Art

A TPON network has been developed by the assignee of the present application and is described in the article "The provision of telephony over passive optical networks" by Hoppitt, C. E. and Clarke, D. E. A., British Telecom Technology Journal, Vol. 7, No. 2, pp 101–114 April, 1989. The signals from the different outstations, or network terminations, are bit-interleaved in the upstream multiframe, and correspondingly in the downstream multiframe. The outstations have separate transmitters and receivers, and thus it is possible for an outstation to transmit traffic signals at allocated channels in the upstream multiframes at the same time that it receives signals from the downstream multiframes.

In such a TPON network it would not be a simple matter to employ a transceiver, i.e. a single transducer for both functions, in an outstation. The central station, or head-end, would need to compute for each bit transmitted to each outstation which bits in the upstream multiframe would correspond to a transmit/receive conflict, i.e. that (a) the outstation was required to transmit at the same time as it was receiving, or (b) that the outstation was required to receive a bit before recovering from transmission of a bit to the central station. The allocations of the bit positions in the downstream and upstream multiframes for communications between the central station and an outstation would be determined by the results of the respective computation by the central station.

BRIEF SUMMARY OF THE INVENTION

According to a first aspect of the present invention there is provided a method of communicating via a communications network comprising a central station, a plurality of outstations, and a transmission medium in the form of a branch arrangement between the central station and the outstations, the method comprising transmitting from the central station multiplexed signals for the outstations in the form of a stream of broadcast frames, transmitting from the outstations return signals for the central station in the form of a stream of return frames in which the return signals are passively multiplexed, characterised in that each broadcast frame comprises a control portion and a traffic portion, the control portion comprises a series of contiguous first subframes each containing control information for a respective outstation, and the traffic portion comprising a series of contiguous second subframes each containing multiplexed respective blocks of traffic information for the outstations, and in that in at least one of the outstations the return signals are transmitted using the same transducer that is used for receiving the broadcast frames.

The abovementioned difficulty of employing a transceiver with the bit-interleaved frame format of the above article is alleviated by providing the respective control words in respective contiguous first subframes, and providing the traffic information for respective outstations in respective blocks in each second subframe. This increases the maximum operating range of the network beyond which the transmit/receive conflict occurs, and the central station does not have to do any computations to find out if there are any channel positions in the second subframes which it cannot allocate to a communication with a particular outstation because of a transmit/receive conflict.

Preferably, each of said respective blocks of traffic information is a group of contiguous signal bits.

Preferably, each broadcast frame comprises a respective non-operational portion following the control and traffic portions and in which no control or traffic information signals are transmitted.

Preferably, each broadcast frame comprises a synchronization and ranging portion following one of the non-operational portions.

Preferably, this synchronization and ranging portion follows the non-operational portion which follows the traffic portion.

Preferably, the return frames have substantially the same format as that of the broadcast frames.

Preferably, in each return frame, each corresponding first subframe comprises a control word and a ranging portion.

Preferably, the ranging portion comprises a single pulse preceded and succeeded by respective period containing no pulses.

Preferably, the ranging portion follows the control word.

Preferably, the non-operational portions of return frames contain no signals.

According to a second aspect of the present invention, there is provided a communications network comprising a central station, a plurality of outstations, and a transmission medium in the form of a branch arrangement between the central station and the outstations, the central station being arranged to generate and transmit multiplexed signals for the outstations in the form of a stream of broadcast frames and the outstations being arranged to generate and transmit respective return signals for the central station which are passively multiplexed in a stream of return frames, characterised in that each of the broadcast frames comprises a control portion and a traffic portion, the control portion comprising a series of contiguous first subframes each containing control information for a respective outstation, and the traffic portion comprising a series of contiguous second subframes each containing multiplexed respective blocks of traffic information for the outstations, and in that at least one of the outstations comprises a single transducer arranged to receive the broadcast frames and to transmit return signals onto the transmission medium.

Preferably, the central station is arranged to generate each broadcast frame such that each of said respective blocks of traffic information is a group of contiguous signal bits.

Preferably, the central station is arranged to generate each broadcast frame to comprise a respective non-operational portion following the control and traffic portions and containing no control or traffic information signals.

Preferably, the central station is arranged to generate each broadcast frame to comprise a synchronization and ranging portion following one of the non-operational portions.

Preferably, the central station is arranged to generate each broadcast frame such that the synchronization and ranging portion follows the non-operational portion which follows the traffic portion.

Preferably, each outstation is arranged to generate and transmit its respective return signals such that, in use, return frames received at the central station have substantially the same format as the broadcast frames.

Preferably, each outstation is arranged to generate, for each associated subframe in the return frames, return signals in the form of a control word and a ranging portion.

Preferably, each outstation is arranged to generate the ranging portion in the form of a single pulse preceded and succeeded by a respective period containing no signals.

Preferably, each outstation is arranged to generate the ranging portion after the control word.

Preferably, the outstations are arranged such that the non-operational portions of return frames contain no signals.

BRIEF DESCRIPTION OF THE DRAWINGS

A specific embodiment of a communications network according to the present invention will now be described by way of example with reference to the drawings in which.

DETAILED DESCRIPTION OF EXEMPLARY EMBODIMENTS

Figure 1:
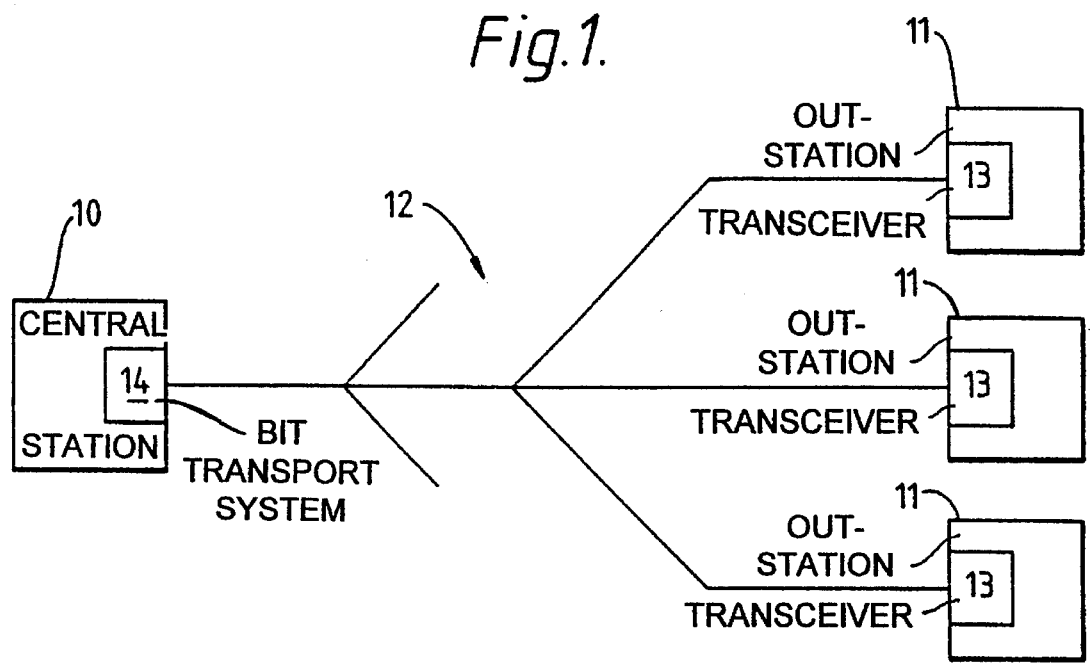
FIG. 1 is a schematic diagram of a TPON network.

FIG. 1 shows in simple schematic form a TPON network comprising a central station or headend 10, a plurality of outstations 11 and an optical fibre transmission medium 12 in the form of a branch arrangement between the central station 10 and the outstations 11. The outstations 11 have a single optical transducer (transceiver) 13 arranged to receive the respective parts of downstream transmissions from the central station 10 and to transmit return information in upstream transmissions from the outstations.

It is not necessary for all the outstations of the network to have transceivers 13, and at least one outstation may have a transmitter transducer and a receiver transducer. Hence the burst interleaved transceiver protocol used in the TPON network of FIG. 1 can be employed retrospectively in existing TPON networks where outstations have separate transmitter and receiver transducers to enable a transceiver 13 to be used in an additional outstation, or in an existing outstation as a replacement for the separate transmitter and receiver.

Figure 2:
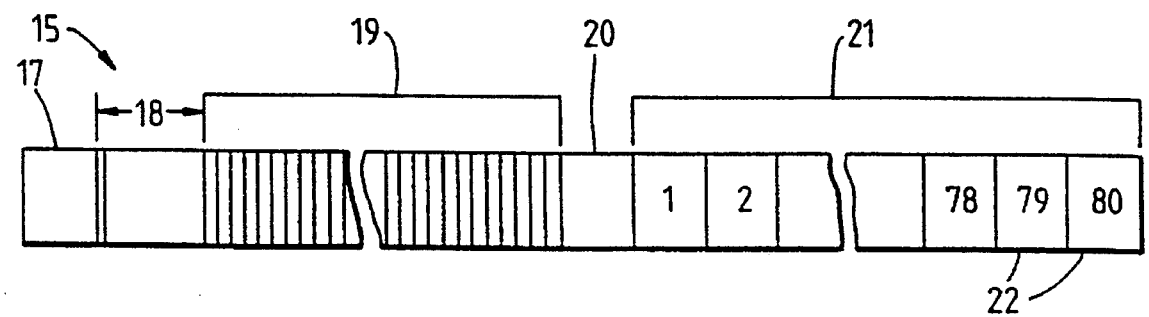
FIG. 2 shows the format of the frame structure.

The central station 10 comprises a bit transport system 14 arranged to generate downstream multiframes 15 as shown in FIG. 2 for transmission to the outstations 11, and to process upstream multiframes 16 (not shown, but having the same format as multiframe 15) received from the outstations 11. The multiframes 15 and 16 constitute broadcast and return frames, respectively of the present invention.

The multiframe 15 in FIG. 2 has a total of 204800 bits, comprising a first quiet period 17 of 2156 bits, followed by a maintenance, sync and phase-1 ranging period 18 of 4292 bits, followed by a control and phase-2 ranging period 19 of 12240 bits, followed by a second quiet period 20 of 2156 bits, and ending with a traffic period 21 of 183920 bits formed by 80 traffic frames 22 each of 2299 bits. There are also 36 bits which are not allocated.

The network can have 144 outstations, and the control and phase-2 ranging period 19 comprises 144 consecutive segments, each of an 80 bit control word followed by a 5 bit window for phase-2 ranging. The segments constitute contiguous first subframes of the present invention.

In this specification phase-1 ranging and phase-2 ranging have the same meaning as in the aforementioned article.

The upstream multiframe which is formed by passive multiplexing of transmissions from the outstations is virtually identical to the multiframe of FIG. 2, and is arranged by suitable timing of the outstation transmissions to be delayed by 2135.5 bits (D) with respect to the downstream multiframe at the central station. Thus the middle of a bit period of the received upstream multiframe can be interrogated for the presence or absence of a signal bit at an edge of the clock pulses in the central station.

Each of the two quiet periods 17 and 20 has a length equal to the delay D between the downstream and upstream multiframes, 2135.5 bits, plus a number of bits equivalent to the recovery period allocated for the transceiver, 20.5 bits.

Considering the second quiet period 20, this is provided for the worst case condition when the outstation which is allocated the identification number "144" is disposed at the minimum range of the network, adjacent the central station. In other words, there is virtually no transmission delay between the central station and outstation number "144" as compared with outstations that are further from the central station. Thus this worst case outstation will receive segment number "144" of the period 19 from the central station, effect a maximum delay, transmit a corresponding upstream segment comprising an 80 bit message together with a phase-2 ranging pulse in bit position three of the 5 bit window, and its transceiver will need to have recovered from its transmitting condition in order to receive the first one or more bits of traffic frame number "1", which might be allocated to a traffic transmission from the central station to that outstation. As stated, each traffic frame contains 2299 bits. Each of these bits corresponds to one 8 k bit/s channel. Customers associated with the outstations are allocated the appropriate number of consecutive bits in the traffic frame depending on the bandwidth required by the customer. A single telephone line will require nine consecutive bits (i.e. 64 k bit/s speech plus 8 k bit/s signalling). The outstations will be notified by means of the downstream control words which consecutive bits of the traffic frames have been allocated for their communications.

In contrast to the protocol used in the TPON network disclosed in the above-mentioned article, in which the control words are bit interleaved in the control portions at the end of the basic frames, and the traffic is bit interleaved in the basic frames, in the specific embodiment of the present invention a control word is transmitted as a single group of 80 consecutive bits (together with a phase-2 ranging pulse in the upstream direction) and the traffic bits of a channel in the multiframe are consecutive (i.e. contiguous) in the traffic frames.

Similarly, at the first quiet period 17 the central station may have allocated the last bits in each traffic frame for communication with a worst case outstation adjacent the central station. This outstation will receive traffic frame number "80"from the central station, and after the delay D transmit a corresponding upstream traffic frame number "80". Additionally, its transceiver will need to have recovered from its transmitting condition in order to receive the synchronisation signal (196 bits) at the beginning of the maintenance, sync and phase-1 ranging period 19.

To aid further the understanding of the operation of the network of the present invention, consider the delay D (expressed in bits) at the central station between the downstream and upstream multiframes. For an outstation at maximum range receiving a traffic group of maximum length L (expressed in bits) at a time T (expressed in bits) after transmission from the central station, and immediately transmitting a return traffic group of length L to the central station, the delay D is given by the equation:

$$D = 2T + L$$

Consider also an outstation at minimum range where there is no significant delay over the transmission link between the outstation and the central station. This outstation will receive a traffic group of length L from the central station, and delay for a period D before transmitting a corresponding traffic group of length L. Its transceiver will require a recovery period R before being able to receive the next transmission of a traffic group from the central station. Given that the length of a traffic frame is F, the delay for this outstation is given by the equation:

$$D = F - (L + R)$$

The protocol automatically provides that the traffic groups will have the same maximum allowed length for all outstations, so eliminating L;

$$D = \frac{2T + F - R}{2}$$

Letting the quiet periods 17 and 20 have a length Q gives the length of the control frame constituted by periods 17, 18, 19 and 20 (i.e. that part of the multiframe apart from the traffic frames) as 16532+2Q, and the length of the multiframe (204800 bits) as 16532+2Q+80F. The length Q of the second quiet period 20 is D+R, which is equal to $$\frac{2T + F + R}{2}.$$

Therefore eliminating Q and rearranging gives $$F = \frac{188268 - 2T - R}{81}$$

where T is 996 bits for a range of 10 km (for speed of light of 3×10⁸ m/s and refractive index of 1.46).

Hence F is 2299 bits, and the maximum length L of a traffic group guaranteed for each outstation is given by:

$$\begin{aligned} L &= F - D - R \\ &= 143 \text{ bits.} \end{aligned}$$

Thus an outstation can have the capacity of 143×8 kbits, which would enable a high speed device to work at 1.144 Mbits/s, or provide fifteen separate telephone lines.

The abovementioned protocol can be used by existing TPON networks having separate transmitters and receivers in the outstations, and in this case there will be no limitation due to conflict, and an outstation could be allocated any capacity up to the full capacity of the network. By use of this protocol on such an existing TPON network, this will enable upgrading of the outstations by installation of transceivers.

The term passive multiplexing as used herein means that each outstation is arranged to transmit information in bursts at particular respective times having regard to the reception of downstream frames from the central station and to the transmission delay between the central station and the outstation whereby in the upstream frames received by the central station each outstation burst is received within a corresponding timeslot.

We claim:

1. A method of communicating via a communications network comprising a central station, a plurality of outstations, at least one outstation having one transducer for both transmitting signals to the central station and for receiving signals from the central station, and a transmission medium in the form of a branch arrangement between the central station and the outstations, the method comprising the steps of:

transmitting from the central station multiplexed signals for the outstations in the form of a stream of broadcast frames, transmitting from the outstations return signals for the central station in the form of a stream of return frames in which the return signals are passively multiplexed, each of said broadcast frames having a control portion and a traffic portion, the control portion including a series of contiguous first subframes each containing control information for a respective outstation, and the traffic portion including a series of contiguous second subframes each containing multiplexed blocks of traffic information for the outstations, and at least one of the outstations using the same transducer for transmitting return signals that is used for receiving the broadcast frames.

2. A method as in claim 1, wherein each of said blocks of traffic information is a group of contiguous signal bits.

3. A method as claim 1, wherein each of said broadcast frames comprises a non-operational portion following the control and traffic portions and in which no control or traffic information signals are transmitted.

4. A method as in claim 3, wherein each of said broadcast frames comprises a synchronization and ranging portion following one of the non-operational portions.

5. A method as in claim 4, wherein said synchronization and ranging portion follows the non-operational portion which follows the traffic portion.

6. A method as in claim 1, wherein the return frames have substantially the same format as that of the broadcast frames.

7. A method as in claim 6, wherein in each return frame, each corresponding first subframe comprises a control word and a ranging portion.

8. A method as in claim 7, wherein the ranging portion comprises a single pulse preceded and succeeded by a period containing no pulses.

9. A method as in claim 7, wherein the ranging portion follows the control word.

10. A method as claimed in claim 6, wherein each of said broadcast frames comprises a non-operational portion following the control and traffic portions and in which no control or traffic information signals are transmitted, and wherein the non-operational portions of return frames contain no signals.

11. A communications network comprising:

a central station, a plurality of outstations, a transmission medium in the form of a branch arrangement between the central station and the outstations, the central station including means to generate and transmit multiplexed signals for the outstations in the form of a stream of broadcast frames, the outstations including means to generate and transmit respective return signals for the central station which are passively multiplexed in a stream of return frames, each of said broadcast frames having a control portion and a traffic portion, the control portion including a series of contiguous first subframes each containing control information for a respective outstation, and the traffic portion including a series of contiguous second subframes each containing multiplexed blocks of traffic information for the outstations, and at least one of the outstations including a single transducer arranged to receive the broadcast frames and to transmit return signals onto the transmission medium.

12. A network as in claim 11, wherein the central station including means to generate each of said broadcast frames such that each of said blocks of traffic information is a group of contiguous signal bits.

13. A network as in claim 11, wherein the central station includes means to generate each of said broadcast frames to comprise a respective non-operational portion following the control and traffic portions and containing no control or traffic information signals.

14. A network as in claim 13, wherein the central station includes means to generate each of said broadcast frames to comprise a synchronization and ranging portion following one of the non-operational portions.

15. A network as in claim 14, wherein the central station includes means to generate each of said broadcast frames such that the synchronization and ranging portion follows the non-operational portion which follows the traffic portion.

16. A network as in claim 11, wherein each of said outstations includes means to generate and transmit its respective return signals such that, in use, return frames received at the central station have substantially the same format as the broadcast frames.

17. A network as in claim 16, wherein each of said outstations is arranged to generate, for each associated subframe in the return frames, return signals in the form of a control word and a ranging portion.

18. A network as in claim 17, wherein each of said outstations includes means to generate the ranging portion in the form of a single pulse preceded and succeeded by a respective period containing no signals.

19. A network as in claim 17, wherein each of said outstations includes means to generate the ranging portion after the control word.

20. A network as in claim 16, wherein the central station includes means to generate each of said broadcast frames to comprise a respective non-operational portion following the control and traffic portions and containing no control or traffic information signals, and wherein the outstations are arranged such that the non-operational portions of return frames contain no signals.

21. A method as in claim 1, wherein the return frames transmitted from the outstations are delayed for a delay period with respect to the broadcast frames transmitted from the central station.

22. A method as in claim 21, wherein said delay period is n half bits, where n is a whole number.

23. A method as in claim 21, wherein each of said broadcast frames comprises a non-operational portion in which no control or traffic information signals are transmitted, and the non-operational portion has a length equal to said delay period and a recovery period of the transducer.

24. A network as in claim 11, wherein said means to generate and transmit respective return signals includes means for delaying the return frames transmitted from the substations for a delay period with respect to the broadcast frames transmitted from the central station.

25. A network as in claim 24, wherein said delay period is n half bits, where n is a whole number.

26. A network as in claim 24, wherein the central station includes means to generate each of said broadcast frames to comprise a respective non-operational portion, and the non-operational portion has a length equal to said delay period and a recovery period of the means to generate and transmit return signals.

* * * * *